2,835,554

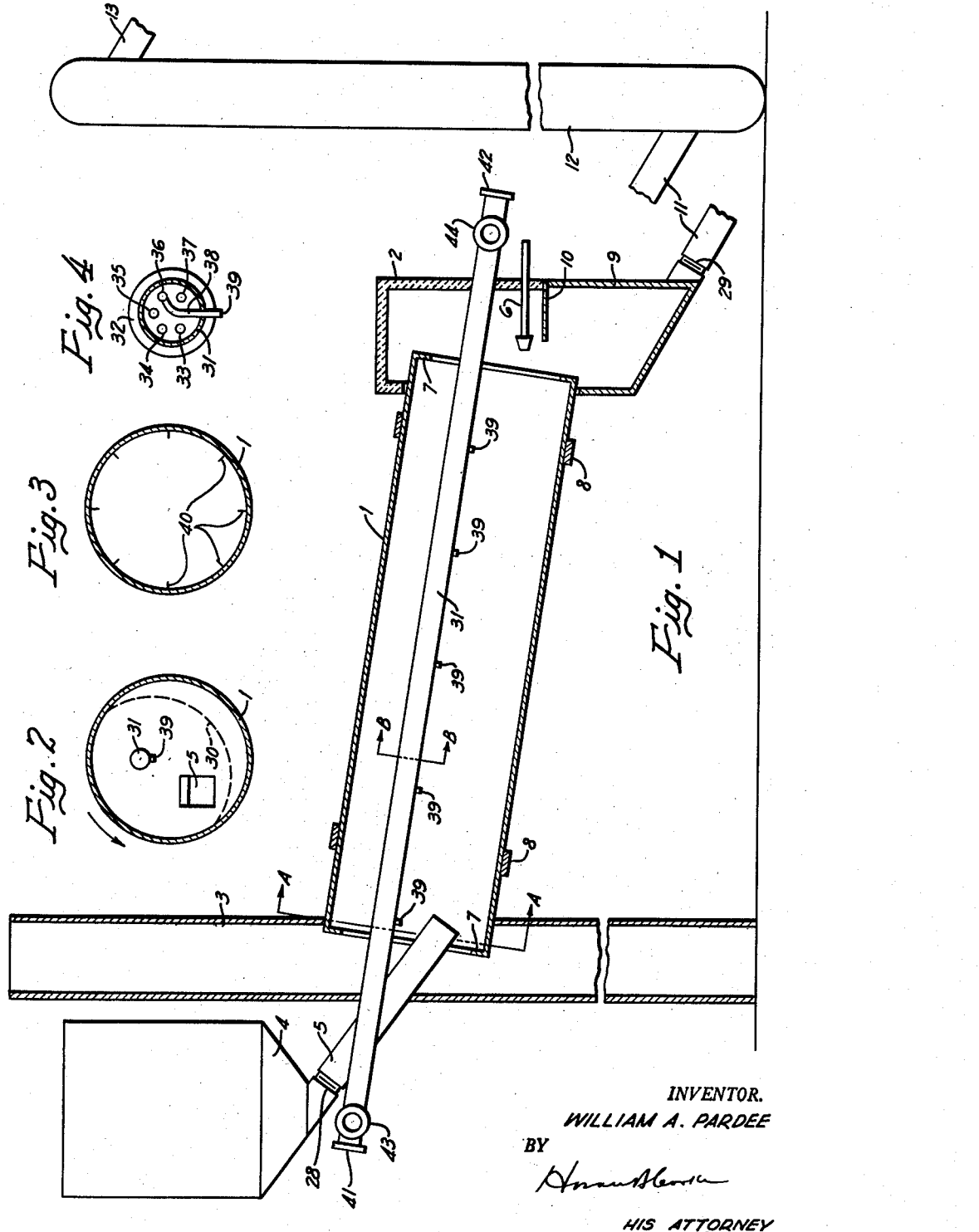

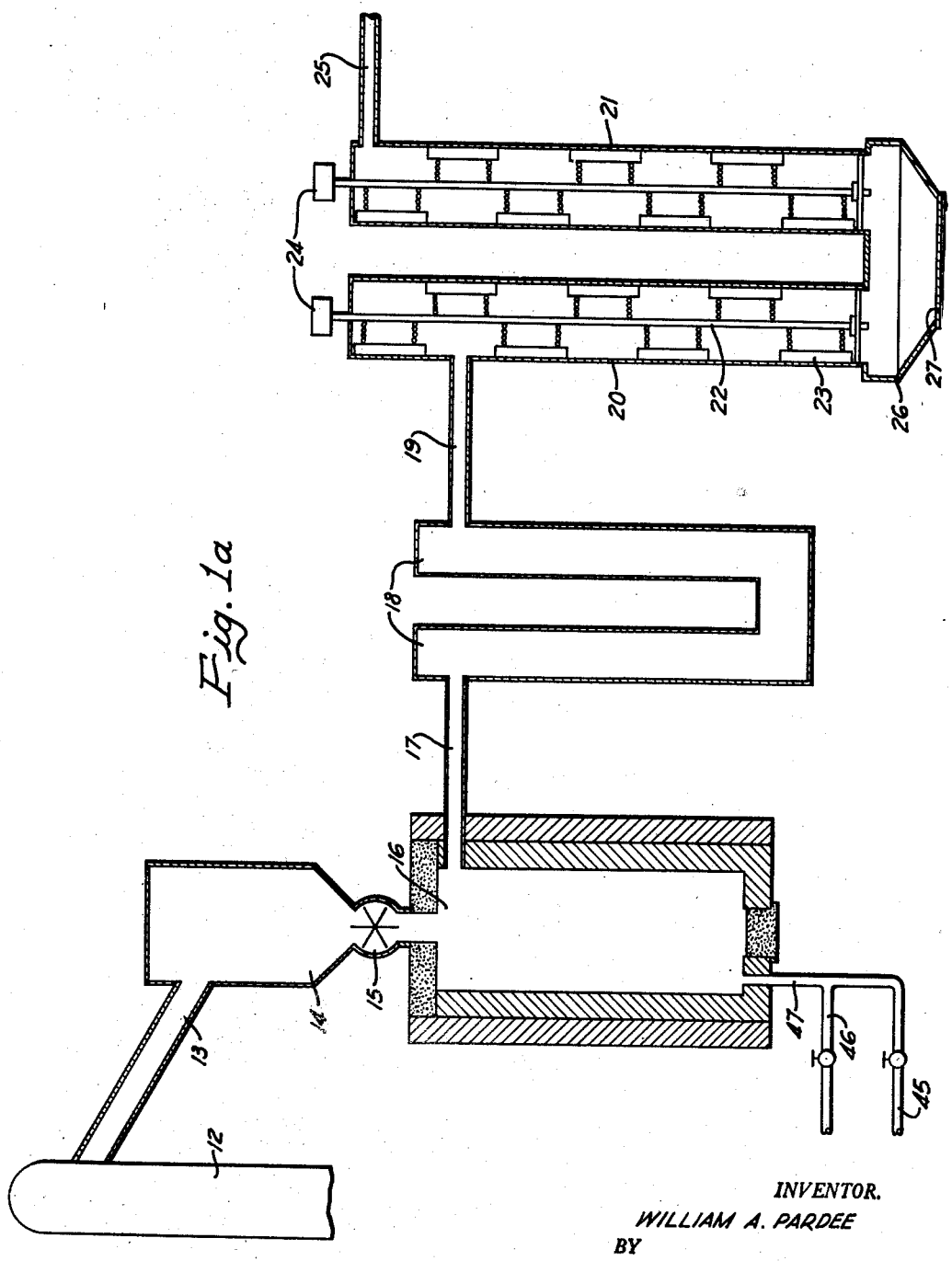

UTILIZATION OF ANHYDROUS ALUMINUM CHLORIDE SLUDGE

William A. Pardee, Fox Chapel, Pa., assignor to Gulf Research & Development Company, Pittsburgh, Pa., a corporation of Delaware Application December 23, 1954, Serial No. 477,247

10 Claims. (Cl. 23—93)

This invention relates to utilization of anhydrous aluminum chloride sludge and more particularly to a process wherein aluminous ore, bauxite, is introduced into a rotary kiln, is heated therein to a temperature of approximately 1600° F., is saturated with molten aluminum chloride sludge during its passage through the said kiln, the said molten aluminum chloride sludge being applied to the bauxite at a multiplicity of spaced points, and the said sludge is carbonized in the pores of the bauxite during the heating, thus forming an intimately combined and highly reactive aggregate of bauxite, alumina, and carbon; and wherein the said highly reactive aggregate is introduced into a retort at the necessary reaction temperature and is there reacted with chlorine to produce anhydrous aluminum chloride; and wherein the anhydrous aluminum chloride is finally condensed and separately obtained.

Anhydrous aluminum chloride is used as a treating agent in the manufacture of hydrocarbon lubricating oils, and also as a catalyst in the isomerization and in the alkylation of light hydrocarbons. In the conduct of these operations the anhydrous aluminum chloride is degraded and it ends up as a heavy black sludge, asphaltic in appearance. These sludges are ordinarily either solid or highly viscous at atmospheric temperatures and they contain some aluminum chloride, heavy polymeric hydrocarbon products, and other products of reaction of aluminum chloride with hydrocarbons. Many attempts have been made to utilize these aluminum chloride sludges, and particularly to recover their content of anhydrous aluminum chloride, but no recovery process has heretofore been commercially successful. As a consequence, the disposal of large quantities of this sludge has become a very serious problem to users of aluminum chloride. This disposal problem in some plants involves several thousand barrels of such sludge each day. While I have not at this time succeeded in devising a method of recovering the anhydrous aluminum chloride content of the sludge, I have devised a method of recovering the aluminum content of the sludge and also its carbon content.

The sludge, when separated from the hydrocarbons with which it has been used, and after cooling to atmospheric temperature, becomes a solid black mass of low ducility. One satisfactory method of handling the sludge is to hydrolyze it with a substantial amount of water, and in that condition it can be pumped as a slurry. The aluminum chloride sludge which I use in the preparation of an aggregate with aluminous material is first hydrolyzed, and the following table gives properties of two characteristic sludges of this character.

|  | Sludge A | Sludge B |
|---|---|---|
| Softening Point, Ring & Ball Method, °F | below 74 | 68 |
| Proximate Analysis: | | |
| Volatile Matter, percent | 69.10 | 74.30 |
| Ash (Aluminum Oxide), percent | 9.85 | 7.08 |
| Fixed Carbon, percent | 21.05 | 17.48 |

The hydrolyzed sludge softens at temperatures little above 70° F. and it is quite fluid at a temperature of about 200° F. When this material is raised to the temperatures which I use in the preparation of my aggregate, I am able to recover the asphaltic content of the sludge as carbon and I am able to recover the aluminum content of the sludge as alumina, $Al_2O_3$. The carbon that I recover from this sludge is ordinarily about one-fifth the weight of the hydrolyzed sludge, dry, and the $Al_2O_3$ recovered is ordinarily about one-tenth the weight of the dry sludge.

In my present invention I prepare an aggregate of bauxite and alumina and carbon in which the bauxite and alumina are thoroughly impregnated with the carbon, the carbon being in such intimate and uniform contact with the bauxite and alumina that the reaction between these solids and chlorine gas is greatly facilitated and can be effected at temperatures within the range of approximately 1000° F. to 1500° F., which range is much below that which has previously been possible. This impregnation of bauxite and alumina with carbon is effected by introducing the bauxite in relatively finely divided form into a heated rotary kiln in which it is heated and at least partially saturated with molten aluminum chloride sludge, by continuing the heating of the bauxite and aluminum chloride sludge mixture (herein sometimes referred to as material-in-process) to a point at which the sludge is at least partially carbonized by adding further molten sludge to the material-in-process at a number of successive points during its progress through the rotary kiln and so spacing the points of sludge introduction as to permit at least partial carbonization of each charge of sludge prior to the introduction of the next such charge and complete carbonization before discharge of the aggregate from the kiln.

The aggregate prepared in the manner just described from the rotary kiln at a temperature of approximately 1600° F. or sufficiently thereabove to permit its introduction at approximately that temperature, or somewhat lower, into a chlorinating retort for reaction with chlorine and creation thereby of anhydrous aluminum chloride. The aluminum chloride vapors are then condensed and separately obtained.

One primary purpose of this invention is to prepare an intermediate product in the form of an ore-carbon aggregate in which the two aluminous materials bauxite and alumina are in unusually intimate contact with the carbon and in which the carbon itself is in uncommonly reactive condition, the aggregate being of unprecedentedly high pore surface area and susceptible of chlorination at temperatures of the order of 1000° to 1500° F. These temperatures compare with temperatures of 1650° to more than 2000° in the prior art. The lower temperature of chlorination possible with my aggregate prevents the conversion of the bauxite and alumina to the less reactive forms into which these aluminous materials are transformed at higher temperatures, keeps it much more porous in the chlorination retort, and greatly speeds up the rate of reaction, all this with a substantial diminution of the necessary retort capacity and a substantial decrease in the production of unreactive bauxite.

In the preparation of my aggregate the aluminous material is thoroughly saturated with molten aluminum chloride sludge and the sludge is then carbonized in the pores of the aluminous material. It is particularly effective, convenient and economic to perform this process in an inclined rotary kiln of the character commonly referred to as a horizontal rotary kiln, wherein the material-in-process can be tumbled and mixed and directly heated simultaneously.

I find it desirable for this purpose to deposit carbon in the pores of the bauxite and alumina in proportions of from 0.45 to more than 1.0 pound of carbon per pound of oxygen in the dry aluminous material, and I find that an aggregate containing such a percentage of carbon is best prepared by adding and carbonizing the aluminum chloride sludge in a series of increments, each increment proportioned to add approximately three percent to seven percent or more of carbon to the aluminous material. These increments are advantageously proportioned with the lower percentages at the cooler end of the horizontal rotary kiln and the higher percentages at the hotter end of the kiln. Also the spacing of the points at which successive increments are introduced is advantageously somewhat greater at the cooler end of the kiln than at the hotter end of the kiln because the partially cooled gases require more time, and therefore more kiln length, to accomplish the carbonization than do the hotter gases at the furnace end of the kiln.

Referring to the accompanying drawings:

Figure 1 is a cross section view of the rotary kiln and its related parts.

Figure 1a is an elevation view of the chlorination apparatus.

Figure 2 is a cross section view taken on A—A of Figure 1.

Figure 3 is a cross section view of the rotary kiln, showing a convenient style of longitudinal bars of "lifters" therein.

Figure 4 is a cross section view of element 31 and related parts, taken on B—B of Figure 1.

Figure 5:
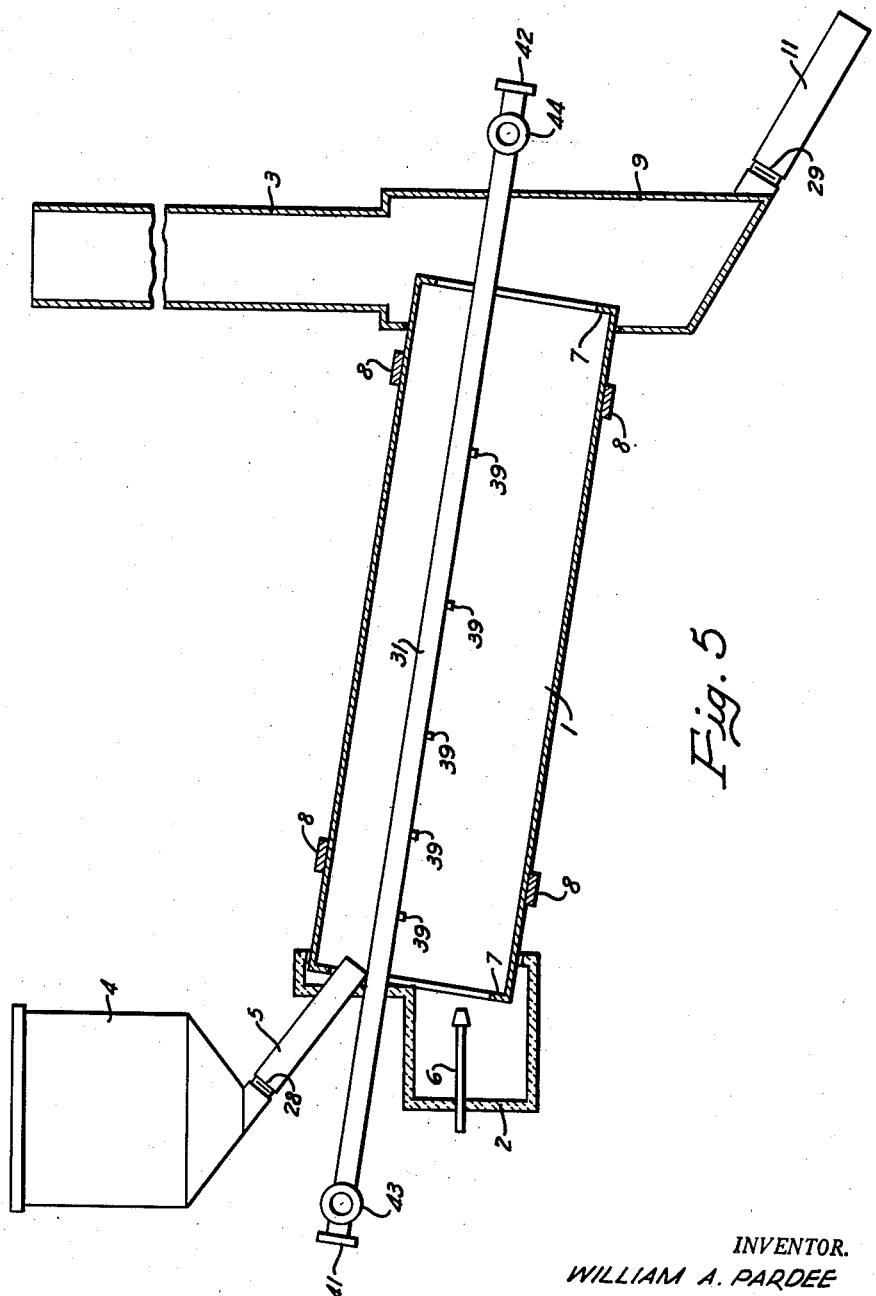

Referring to Figure 1, numeral 1 indicates a horizontal rotary kiln, extending from furnace chamber 2 at its lower end to stack 3 at its upper end. A raw material bin for material to be processed is indicated by numeral 4 and a chute 5 extends from the base of bin 4 into the upper (charging) end of kiln 1. Flow of material from bin 4 to kiln 1 is controlled by gate 28. The kiln is heated by burner 6, this burner being set back in furnace chamber 2 so that its flame will not ignite the molten sludge introduced, as hereinafter described, at the nearest nozzle 39. The kiln 1 discharges processed material at its lower end into receiving bin 9, which is separated from furnace chamber 2 by wall 10. A chute 11 extends from the base of receiving bin 9 to the base of elevator 12, and a gate 29 is provided to control the flow of material from bin 9 to elevator 12.

A jacketed conduit 31 extends through the entire length of horizontal rotary kiln 1, with its respective ends extending through and out beyond stack 3 and furnace chamber 2. It may be supported by the walls of these members 3 and 2 or by separate supports. Conduit 31 is fitted with a series of spray nozzles 39 and it carries in its interior a number of separate smaller conduits, 34 to 37 inclusive (subsequently described in connection with Figure 4), which extend from the individual spray nozzles to headers 41 and 42. Conduit 31 is also fitted with flanges 43 and 44 adjacent its respective ends to permit the introduction and circulation of steam or some other temperature controlling fluid in conduit 31 around the exterior of the aforementioned smaller conduits.

Referring to Figure 1a, an elevator 12 discharges the processed material, which at this stage is otherwise referred to as aggregate, into a chute 13 which in turn delivers the material to a bin 14. This bin 14 discharges through star-valve 15 into the top of chlorinating retort 16. Conduit 17 conducts vapors of aluminum chloride from retort 16 to precooler 18. Conduit 19 conducts precooled vapors from precooler 18 to condensing tubes 20 and 21, which are in mutual communication through bin 26. These tubes 20 and 21 are advantageously surrounded by water jackets which, for simplicity of representation, are not shown. Each of condensing tubes 20 and 21 has a shaft 22 in axial alignment therewith and each of these shafts 22 carries a series of scraper plates 23 positioned to sweep the condenser walls from top to bottom and fastened to the shaft 22 by means of a number of short lengths of chain. Each shaft 22 also carries a pulley wheel 24 at its head, through which it may be rotated. This rotation of shafts 22 throws the scraper plates 23 out against the interior walls of tubes 20 and 21, to dislodge aluminum chloride condensed thereon. Bin 26 collects condensed aluminum chloride scraped from the interior walls of tubes 20 and 21 and this aluminum chloride is emptied from bin 26 by removal of plate 27. A horizontal Archimedean screw can be conveniently substituted for plate 27. A tail-pipe 25 is provided to conduct uncondensed gases from the equipment.

Referring to Figure 2, this is a cross section taken on section line A—A of Figure 1. Figure 2 shows the discharge end of chute 5 and it shows jacketed conduit 31. Conduit 31 is positioned with its longitudinal axis parallel to the longitudinal axis of horizontal rotary kiln 1, and its axis will be at a point high enough to spray liquid asphalt onto the contents of the kiln from nozzle 39. The longitudinal axis of jacketed line 31 may be positioned somewhat to the side of the vertical axis of the kiln 1 in order to avoid having the material-in-process fall upon it during rotation of the kiln. Numeral 30 identifies a dotted line depicting the approximate surface of the discrete material-in-process while the kiln is rotating in a contra-clockwise direction.

Figure 3 is a cross sectional view of kiln 1 showing the interior thereof fitted with a series of longitudinal ledges or "lifters" 40 to increase the agitation of discrete material-in-process during its progress through the kiln. These have some advantages in the hotter end of the kiln.

Figure 4 is a cross section of jacketed conduit 31, taken on section line B—B of Figure 1. In this view, numeral 31 indicates the metallic conduit and 32 indicates a heavy jacket of insulating material which entirely surrounds conduit 31. Numerals 33, 34, 35, 36, and 37 indicate a series of smaller separate conduits inside of conduit 31 which lead to individual spray nozzles 39 and which terminate at their other end at header 41 or 42, at which point they are connected to individual supply lines, not shown. The number of these smaller conduits is determined by the needs of the process as hereinafter discussed. Each of the conduits of the series 33 to 37 inclusive is connected to a spray nozzle 39 through a connection 38. Figure 4 shows the manner of the connection from smaller conduit 36 to its nozzle 39.

Figure 5 is a modification of the kiln shown in Figure 1. All the numbered parts of Figure 5 correspond to those of Figure 1, and the difference between the apparatus of Figure 1 and that of Figure 5 is that the furnace 2 and the stack 3 in Figure 5 are at ends of the kiln 1 opposite to those shown in Figure 1. In the apparatus of Figure 1 the material-in-process and the combustion gases flow in the same direction.

In the practice of this invention bin 4 is loaded with bauxite ore of approximately half inch and less in size. There is advantage in having the bauxite fairly fine. Kiln 1, rotated by means of gears 8, is put in operation. Burner 6 is ignited to provide the necessary heat for the operation. Ore from bin 4 is passed through chute 5 into horizontal rotary kiln 1. A gate 28 or star-valve or other device of similar function is positioned to control the flow of bauxite from bin 4 into kiln 1.

When the operation is well established and conditions have attained equilibrium the material being processed will discharge over flange 7 of kiln 1 into bin 9 at a temperature of approximately 1600° F. The bauxite entering the kiln 1 from bin 4 may be calcined or uncalcined bauxite at atmospheric temperature or it may be either of these at a somewhat elevated temperature. Uncalcined bauxite produces a somewhat more reactive aggregate.

Molten anhydrous aluminum chloride sludge to be sprayed on the bauxite during its passage through the kiln is charged through conduits 33, 34, 35, 36 and 37.

all encased in conduit 31. This conduit 31 is exposed to the high temperature gases in kiln 1 and to prevent overheating and possible coking of the sludge in conduits 33 to 37 inclusive two separate means of protection are provided. The first is heavy fireproof insulation 32 of minimum heat conductivity. The second is a continuous flow of steam or other temperature controlling fluid through the conduit 31. Flanges 43 and 44 are provided to receive and discharge the temperature controlling fluid. This temperature controlling fluid may be introduced at either end or it may with some advantage be conducted in a closed pipe inside conduit 31 to a point part way through the length of conduit 31 and discharged therefrom to both ends 43 and 44.

It is desirable to be able to positively control the amount of molten sludge introduced at each point of introduction, wherefore a separate pipe of the group 33 to 37 inclusive is provided for each spray nozzle 39. The separate pipes connect to either header 41 or header 42 and are there connected to lines from sludge pumps. A separate line from a separate pump to each individual nozzle 39 permits volumetric control of the molten sludge introduced at each nozzle 39 and also serves to reduce possibility of coking a portion of a line or coking a nozzle 39 as would occur much more readily if several nozzles were served by a single line and the molten sludge were free to flow out through the channel of least resistance. To minimize the heating of sludge in conduits 33 to 37 inclusive by the hot gases in the kiln it is advantageous to extend some of these lines inward from header 41 and some from header 42 according to the relative proximity to those headers of the individual terminal nozzle 39 and the severity of the heat in the section of the kiln that the conduit must pass through.

While the accompanying drawings show five conduits, 33 to 37 inclusive, for charging molten sludge, it is not necessary that there be that specific number. The actual number in any particular installation may be greater or in some special cases somewhat less, according to the kiln temperature and carbonizing characteristics of the sludge. The actual number of points of introduction of sludge along the length of the kiln should be sufficient to permit the individual increments of molten sludge to be so limited in quantity that each individual increment will be promptly absorbed into the material-in-process and rapidly carbonized. The aluminum chloride sludge shows no tendency to adhere to the walls of the kiln.

The minimum amount of carbon required in an aggregate is that amount which will react with all of the combined oxygen of the ore to reduce the same. I have found that the required minimum of carbon to reduce the ore is an amount within the range of from 45 pounds of carbon up to 60 pounds of carbon per hundred pounds of oxygen in the dry bauxite and alumina. In the preparation of the aggregate it may be necessary to use more asphalt than that necessary to produce the above amount of carbon, this additional amount going to provide for three other sources of carbon consumption, viz: burn-off of carbon in the kiln if excess air is present; burn-off of carbon in handling the hot briquettes from kiln to subsequent processing apparatus; and burn-off in the final processing (e. g. chlorination) if air or oxygen is introduced at that stage to maintain the temperature of reaction or for other purposes. The magnitude of these three demands for carbon is determined exclusively by conditions of operation, which are within the control of the operator, and this additional carbon should be provided according to need.

In a kiln which operates with the furnace gases flowing countercurrent to the material-in-process, and with the gases leaving the kiln and entering the stack 3 at from 600° to 800° F., the maximum percentage of molten sludge that can ordinarily be introduced at the stack end of the kiln is such as will add about three percent to five percent of carbon to the aluminous material, measured after the molten sludge is carbonized by the heat in the kiln. With a temperature of 1700° to 2000° F. for the furnace gases entering the kiln at the hot end, the maximum percentage of molten sludge that can ordinarily be introduced from one nozzle close to that end is such as will add anywhere from about five percent to seven and one-half percent of carbon to the aluminous material. Quantities of sludge intermediate the foregoing figures are introduced at the intermediate nozzles. The introduction of molten sludge at the various nozzles in lesser quantities than those just stated is unobjectionable except that such practice may require a greater number of nozzles and even additional length of kiln.

The minimum amount of molten sludge that must be introduced to produce a certain amount of carbon on the aluminous material is susceptible of ready calculation from the fixed carbon content of the particular asphalt used, but that figure must be increased to allow for the carbon burned as a consequence of any excess air in the combustion gases. The amount of excess air is solely within the control of the operator, and this excess air should be kept to a minimum or be totally eliminated, even at the expense of some loss of efficiency in combustion of fuel.

In Figure 2 I have shown the conduit 31 with the nozzle 39 pointing directly downward. In some cases it may be more advantageous to rotate the conduit 31 counter-clockwise about 45°, the actual position being chosen to put the spray of molten sludge on the bauxite and to keep it away from the shell of kiln 1.

The combustion gases from the burner 6, together with distilled-off volatile matter, pass out of the upper end of the kiln into stack 3 and discharge to the atmosphere.

The material prepared in kiln 1 is finally discharged over flange 7 at the lower end of the kiln into receiving bin 9, this bin being separated from furnace chamber 2 by means of wall 10. At this stage this material is aptly termed aggregate. From bin 9 the aggregate flows down chute 11 to the base of elevator 12. Passage of aggregate from bin 9 to chute 11 is controlled by gate 29 and enough material is maintained in bin 9 to keep the passage into chute 11 sealed and thereby prevent any tendency for furnace gases from furnace 2 to flow thereinto.

If the aggregate discharges from kiln 1 in larger size pieces than are desired for charging to the chlorination retort, a crusher can be installed in the system at a point between bin 9 and the base of elevator 12. It is not ordinarily desirable to charge to the chlorinating retort any large proportion of pieces of aggregate with a maximum dimension in excess of five inches.

The hot aggregate, after having been crushed if necessary, is elevated by elevator 12 or a skip-hoist or other equivalent means, discharged through chute 13 (Figure 1a) into charging bin 14, and finally charged through star valve 15 or an equivalent mechanism into chlorinating retort 16. A sufficient amount of solid material is always retained in bin 14 to prevent the passage thereinto of chlorine or aluminum chloride vapors from the chlorinating retort. The temperature of the aggregate entering chlorinating retort 16 should be between 1200° and 1600° F., advantageously not in excess of 1500° F.

Entering the bottom of chlorinating retort 16 is conduit 47 carrying chlorine gas from valved conduit 45 and which may also carry oxygen from valved conduit 46. In contrast with the usual much higher temperature of operation we find it possible, with an aggregate made as herein described, to successfully accomplish the chlorination at satisfactory reaction rates while operating at temperatures as low as 1200° F. This is to a considerable degree a consequence of the high pore surface area of aggregate prepared according to my invention, which pore surface area commonly runs one hundred and forty square meters per gram of aggregate and higher.

The generated vapors of anhydrous aluminium chloride pass from the upper part of chlorination retort 16 through passageway 17 into a precooling chamber 18 in which they are advantageously cooled to a temperature of about 500° F. or slightly below. The precooler is advantageously an uninsulated metallic chamber with no other cooling medium than the surrounding atmosphere.

Anhydrous aluminum chloride does not have a liquid phase but sublimes slightly below 370° F. The vapors leave the precooler at a temperature above their subliming temperature and enter vertical condenser column 20. Vapors not condensed in column 20 pass through the upper portion of collecting bin 26 into condenser column 21, and tail gases leave the system through tail pipe 25.

Condensing columns 20 and 21 are advantageously surrounded by water jackets in order to minimize their size and to assure substantially total condensation of the anhydrous aluminum chloride. These water jackets have been omitted from Figure 1a of the accompanying drawings in order to simplify the representation.

Introduction of oxygen into the chlorinating retort through line 46 will not ordinarily be necessary once the reaction has gotten established in the retort, but it can be quite advantageous if the retort temperature tends to drop below the necessary minimum. Such use of oxygen of course consumes a part of the carbon in the aggregate and this use of oxygen should be accompanied by an increased percentage of carbon in the aggregate being produced in kiln 1 in order that sufficient carbon may be present in the chlorinating retort to permit ready reduction of the aluminous ore. Any oxygen introduced into the retort may be in the form of air or in the form of oxygen-enriched air. In the conduct of my process I find air fully adequate without oxygen enrichment.

The foregoing description of my process covers an operation in which only bauxite and alumina and molten sludge are charged to kiln 1. However, my process is not so limited and I may charge some coke with the bauxite, thus reducing the amount of sludge required. When coke is charged with the bauxite it is broken down to the same size as the bauxite or it may be even smaller in size. In any case, whether or not coke is charged with the bauxite, the amount of molten sludge used in preparing an aggregate must be sufficient to provide the carbonaceous material to saturate the bauxite and to produce an aggregate in which the carbon is bound to the bauxite and alumina and is well distributed through the pores thereof, forming a uniformly black material. The aggregate made with bauxite and aluminum chloride sludge alone is uncommonly reactive, having a high pore surface area. It is preferable that added coke, if any, be a minor proportion in relation to that formed from the asphalt aluminum chloride sludge in kiln 1. Added coke is not the equivalent, in my process, of carbon resulting from the aluminum chloride sludge, and the pore surface area of an aggregate in which coke has been used will be lower than the pore surface area of an aggregate prepared solely from bauxite and aluminum chloride sludge.

It has been stated that the aggregate produced in kiln 1 and subsequently subjected to further processing is characterized by an uncommonly high degree of porosity and pore surface area, and that this greater porosity appears to be the reason that I am able to attain results in the chlorination of bauxite that have not previously been attained. Specific pore surface areas have been given. These pore surface areas have been determined by the well known B. E. T. method, developed by Brunauer, Emmett, and Teller and first published in the Journal of the American Chemical Society, volume 60, at page 309 (1938). This method was subsequently published in A Treatise on Physical Chemistry, edited by Hugh S. Taylor and Samuel Glasstone and published in 1951 by D. Van Nostrand Company, New York: see volume II, pages 602 et seq.

The pore surface areas given in this application for patent were determined with use of nitrogen gas.

By way of specific data on the unprecedentedly high pore surface area of the aggregate prepared in kiln 1 by my process I submit the following scientific determinations:

Bauxite of the analysis given in my first specific example, when calcined at a maximum temperature of 1600° F. had a pore surface area of 121 square meters per gram.

Ordinary petroleum coke, commonly used with bauxite in the preparation of charge for chlorinating retorts, has a pore surface area of less than 20 square meters per gram, and often less than 10 square meters per gram.

Aggregate prepared by the process described and claimed herein, and carbonized at 1600° F. had a pore surface area of 140 square meters per gram.

Some of the aggregate just described above as having a pore surface area of 140 square meters per gram was ignited at 1000° F., and the bauxite residue had a pore surface area of 104 square meters per gram.

The description of my process, up to this point, is directed to an operation in which the flow of the material-in-process and of the combustion gases is countercurrent. However, the process can, with equal effectiveness and advantage, be operated with the material-in-process and the combustion gases flowing in the same direction. The necessary apparatus for this type of operation is shown in Figure 5, which has already been described. When, as in Figure 5, the furnace is positioned at the higher end of the kiln and the material-in-process and the combustion gases flow in the same direction, it is possible to get the bauxite to a substantially elevated temperature in very short travel and to then apply the molten aluminum chloride sludge to the bauxite at a temperature conducive to prompt saturation and coking.

In contrast with the high temperatures of 1600° to 1800° F. required for chlorination of bauxite and coke mixtures in the past, aggregates made according to the invention herein described will chlorinate about 40% more rapidly at a temperature of 1000° F. than a mechanical mixture of finely divided bauxite and coke will chlorinate at a temperature of 1550° F. Operating at 1000° F. my aggregate was repeatedly chlorinated with from 93% to 99% conversion of the bauxite. In contrast with these results, while conducting the operation in the same manner, I was unable to attain a conversion of more than 56% of the bauxite when operating at a temperature of 1550° F. with a mechanical mixture of finely divided bauxite and coke, and I was unable to attain a conversion of more than 68% of the bauxite in the same mixture when chlorinating at 1800° F. Tests show that my aggregate chlorinates as well at temperatures in the range of 1300° to 1400° F. as was possible at 1800° F. when chlorinating by previously known methods.

The advantages of my process become apparent in aggregates containing as low as three to four percent carbon resulting from the sprayed aluminum chloride sludge. The advantages increase with increase of carbonized sludge and reach a maximum in the case of aggregate containing twenty to twenty-five percent of carbon resulting from the sprayed aluminum chloride sludge. Greater amounts of such carbon do not result in any substantial additional advantage.

The relatively low temperatures used in my process are not merely temperatures which can be used but they are temperatures which should be used. By way of illustrating this point separate but identical samples of a bauxite-asphalt aggregate was maintained for a period of sixteen hours in an atmosphere of nitrogen at temperatures of 1550° F., 1800° F., 2100° F., and 2400° F. X-ray diffraction patterns of these samples indicated the presence of only alpha $Al_2O_3$ in the samples which had been maintained at 2100° F. and at 2400° F. The sample maintained at 1800° F. comprised alpha $Al_2O_3$ and some transition form of $Al_2O_3$ between the gamma and alpha forms. The sample of $Al_2O_3$ heated at 1550° F. was principally of the gamma and chi forms. The alpha form of alumina is of very low reactivity, and the reactivity increases sharply through the gamma and chi forms.

The following is a specific example of the conduct and results of my process.

A horizontal rotary kiln such as hereinbefore described was charged with 2800 pounds per hour of bauxite containing 32.7% $H_2O$ and through conduits 33 to 37 inclusive and nozzle 39, with 3500 pounds per hour of alchlor sludge. The bauxite, on a water-free basis, analysed as follows:

| | Percent by weight |
|---|---|
| $Al_2O_3$ | 90.8 |
| $TiO_2$ | 1.7 |
| $SiO_2$ | 4.5 |
| $Fe_2O_3$ | 1.0 |

The alchlor sludge had the following properties:

| | | |
|---|---|---|
| Softening point, ring and ball method | ° F. below | 74 |
| Volatiles | percent | 69.10 |
| Ash (aluminum oxide) | do | 9.85 |
| Fixed carbon | do | 21.05 |

The aggregate was prepared in a horizontal rotary kiln having a length of 60 feet and a diameter 6 feet. The bauxite was heated therein in the first five feet of travel and at five feet from the entrance it received its first spray of liquefied aluminum chloride sludge. Four additional sprays of liquefied aluminum chloride sludge were charged to the material-in-process, these sprays being positioned at distances of 20 feet, 33 feet, 44 feet, and 53 feet from the point at which the bauxite was introduced, the last of these points being seven feet from the discharge end of the kiln. The liquefied aluminum chloride sludge completely penetrated the bauxite and with the furnace chamber temperature at 1900° F. and with gases leaving the kiln at a temperature of 700°, each increment of liquefied aluminum chloride sludge was well carbonized before the addition of the next increment. Residence time of the material in the kiln was approximately 75 minutes. The fully carbonized aggregate contained 67 pounds of carbon per hundred pounds of oxygen in the bauxite and in the aluminum oxide content of the sludge, and the burn-off in the kiln was approximately three percent. This burn-off of carbon is, of course, in addition to the distilled-off volatile matter.

The fully carbonized aggregate left the kiln at a temperature of 1640° F. and had a temperature of approximately 1400° F. when it entered the chlorination retort. Dry chlorine gas at atmospheric temperature was charged to the retort through line 35 and the chlorination reaction proceeded smoothly and with the production of no vitreous alumina in the base of the retort. The anhydrous aluminum chloride was condensed in condenser tubes 20 and 21 and collected in bin 26.

In this specification and the appended claims the term "horizontal rotary kiln" is used to designate the type of kiln commonly known by that designation, notwithstanding that such kilns are in fact inclined kilns having the charging end elevated somewhat above the discharge end.

In the appended claims, when I use the term aluminum chloride sludge, I means thereby a sludge which has resulted from the reaction of anhydrous aluminum chloride with hydrocarbons and which may or may not have been subsequently hydrolyzed.

I claim:

1. The process of manufacturing anhydrous aluminum chloride which comprises: charging aluminous ore to a heated horizontal rotary kiln; rotating the kiln and thereby tumbling the said ore and causing it to travel longitudinally through the said kiln; applying a small percentage of liquefied aluminum chloride sludge to the aluminous ore at a point near the charging end of the said kiln; maintaining the temperature in the said kiln within a range that will carbonize the applied sludge; carbonizing the applied small percentage of sludge; successively applying and carbonizing additional small percentages of aluminum chloride sludge with the said ore during its longitudinal passage through the said kiln; discharging from the kiln an aggregate of fully carbonized aluminum chloride sludge and aluminous material; charging the said aggregate to a retort at a temperature between 1000° F. and 1500° F. and there reacting the hot aggregate with chlorine gas, thereby producing vapors of anhydrous aluminum chloride; cooling and condensing the vapors of anhydrous aluminum chloride and so separately obtaining the same.

2. The process of manufacturing anhydrous aluminum chloride which comprises: charging bauxite ore to a heated horizontal rotary kiln; rotating the kiln and thereby tumbling the bauxite and causing it to travel longitudinally through the said kiln; applying a small percentage of liquefied aluminum chloride sludge to the bauxite at a point near the charging end of the said kiln; maintaining the temperature in the said kiln within a range that will carbonize the applied sludge; carbonizing the applied small percentage of sludge; successively applying and carbonizing additional small percentages of aluminum chloride sludge with the said bauxite during its longitudinal passage through the said kiln until the carbon content of the aggregate is at least 0.45 pound per pound of oxygen in the aluminous content thereof; discharging from the kiln an aggregate of fully carbonized aluminum chloride sludge and bauxite; charging the said aggregate to a retort at a temperature between 1000° F. and 1500° F. and there reacting the hot aggregate with chlorine gas, thereby producing vapors of anhydrous aluminum chloride; cooling and condensing the vapors of anhydrous aluminum chloride and so separately obtaining the same.

3. The process of manufacturing anhydrous aluminum chloride which comprises: charging aluminous ore to a heated horizontal rotary kiln; rotating the kiln and thereby tumbling the said ore and causing it to travel longitudinally through the said kiln; applying a small percentage of liquefied aluminum chloride sludge to the said ore at a point near the charging end of the said kiln; maintaining the temperature in the said kiln within a range that will carbonize the applied sludge; carbonizing the applied small percentage of sludge; successively applying and carbonizing additional small percentages of aluminum chloride sludge with the said aluminous ore during its longitudinal passage through the said kiln; discharging from the kiln an aggregate of fully carbonized aluminum chloride sludge and aluminous ore having a pore surface area of at least 100 square meters per gram of aggregate; charging the said aggregate to a retort at a temperature between 1000° F. and 1500° F. and there reacting the hot aggregate with chlorine gas, thereby producing vapors of anhydrous aluminum chloride; cooling and condensing the vapors of anhydrous aluminum chloride and so separately obtaining the same.

4. The process of manufacturing anhydrous aluminum chloride which comprises: charging aluminous ore to a heated horizontal rotary kiln; rotating the kiln and thereby tumbling the said ore and causing it to travel longitudinally through the said kiln; applying to the said ore at a point near the charging end of the said kiln a small percentage of liquefied aluminum chloride sludge sufficient to saturate the aluminous ore therewith; maintaining the temperature in the said kiln within a range that will carbonize the applied sludge; carbonizing the applied small percentage of sludge; successively applying and carbonizing additional small percentages of aluminum chloride sludge with the said aluminous ore during its longitudinal passage through the said kiln until the carbon content of the carbonized aggregate is at least 0.45 pound per pound of oxygen in the aluminous content thereof;

discharging from the kiln an aggregate of fully carbonized aluminum chloride sludge and aluminous ore; charging the said aggregate to a retort at a temperature between 1000° F. and 1500° F. and there reacting the hot aggregate with chlorine gas, thereby producing vapors of anhydrous aluminum chloride; cooling and condensing the vapors of anhydrous aluminum chloride and so separately obtaining the same.

5. The process of manufacturing anhydrous aluminum chloride which comprises: charging aluminous ore to a heated horizontal rotary kiln; rotating the kiln and thereby tumbling the said ore and causing it to travel longitudinally through the said kiln; applying to the said ore at a point near the charging end of the said kiln a small percentage of liquefied aluminum chloride sludge sufficient to saturate the aluminous ore therewith; maintaining the temperature in the said kiln within a range that will carbonize the applied sludge; carbonizing the applied small percentage of sludge and thereby producing an aggregate of carbonized aluminum chloride sludge and aluminous material; successively applying and carbonizing additional small percentages of aluminum chloride sludge with the said aluminous ore during its longitudinal passage through the said kiln until the carbon content of the said aggregate is at least 0.45 pound per pound of oxygen in the aluminous content thereof; discharging from the kiln an aggregate of fully carbonized aluminum chloride sludge and aluminous ore having a pore surface of at least 100 square meters per gram of aggregate; charging the said aggregate to a retort at a temperature between 1000° F. and 1500° F. and there reacting the hot aggregate with chlorine gas, thereby producing vapors of anhydrous aluminum chloride; cooling and condensing the vapors of anhydrous aluminum chloride and so separately obtaining the same.

6. The process of manufacturing anhydrous aluminum chloride which comprises: charging aluminous ore to a heated horizontal rotary kiln; rotating the kiln and thereby tumbling the said ore and causing it to travel longitudinally through the said kiln; applying a small percentage of liquefied aluminum chloride sludge to the aluminous ore at a point near the charging end of the said kiln; maintaining the temperature in the said kiln within a range that will carbonize the applied sludge; carbonizing the applied small percentage of sludge and thereby producing an aggregate of carbonized aluminum chloride sludge and aluminous material; successively applying and carbonizing additional small percentages of aluminum chloride sludge with the said aluminous ore during its longitudinal passage through the said kiln until the carbon content of the carbonized aggregate is at least 0.45 pound per pound of oxygen in the aluminous content thereof; discharging from the kiln an aggregate of fully carbonized aluminum chloride sludge and aluminous ore having a pore surface area of at least 100 square meters per gram of aggregate; charging the said aggregate to a retort at a temperature between 1000° F. and 1500° F. and there reacting the hot aggregate with chlorine gas, thereby producing vapors of anhydrous aluminum chloride; cooling and condensing the vapors of anhydrous aluminum chloride and so separately obtaining the same.

7. The process of manufacturing anhydrous aluminum chloride which comprises: charging aluminous ore to a heated horizontal rotary kiln; rotating the kiln and thereby tumbling the said ore and causing it to travel longitudinally through the said kiln; applying a small percentage of liquefied aluminum chloride sludge to the aluminous ore at a point near the charging end of the said kiln; maintaining the temperature in the said kiln within a range that will carbonize the applied sludge, while not heating the material-in-process above approximately 1600° F.; carbonizing the applied small percentage of aluminum chloride sludge; successively applying and carbonizing additional small percentages of aluminum chloride sludge with the said aluminous ore during its longitudinal passage through the said kiln; discharging from the kiln an aggregate of fully carbonized aluminum chloride sludge and aluminous ore; charging the said aggregate to a retort at a temperature between 1000° F. and 1500° F. and there reacting the hot aggregate with chlorine gas, thereby producing vapors of anhydrous aluminum chloride; cooling and condensing the vapors of anhydrous aluminum chloride and so separately obtaining the same.

8. The process of manufacturing anhydrous aluminum chloride which comprises: charging aluminous ore to a heated horizontal rotary kiln; rotating the kiln and thereby tumbling the said ore and causing it to travel longitudinally through the said kiln; applying a small percentage of liquefied aluminum chloride sludge to the aluminous ore at a point near the charging end of the said kiln; maintaining the temperature in the said kiln within a range that will carbonize the applied aluminum chloride sludge, while not heating the material-in-process above approximately 1600° F.; carbonizing the applied small percentage of sludge and thereby producing an aggregate of carbonized aluminum chloride sludge and aluminous material; successively applying and carbonizing additional small percentages of aluminum chloride sludge with the said aluminous material during its longitudinal passage through the said kiln until the carbon content of the fully carbonized aggregate is at least 0.45 pound per pound of oxygen in the aluminous content thereof; discharging from the kiln an aggregate of fully carbonized asphalt and bauxite; charging the said aggregate to a retort at a temperature between 1000° F. and 1500° F. and there reacting the hot aggregate with chlorine gas, thereby producing vapors of anhydrous aluminum chloride; cooling and condensing the vapors of anhydrous aluminum chloride and so separately obtaining the same.

9. The process of manufacturing anhydrous aluminum chloride which comprises: charging to a heated horizontal rotary kiln a major portion of aluminous ore and a minor portion of coke; rotating the kiln and thereby tumbling the aluminous ore and coke and so causing them to travel longitudinally through the said kiln; applying a small percentage of liquefied aluminum chloride sludge to the said major portion of aluminous ore and said minor portion of coke at a point near the charging end of said kiln; maintaining the temperature in the said kiln within a range that will carbonize the applied aluminum chloride sludge; carbonizing the applied small percentage of aluminum chloride sludge and thereby producing an aggregate of carbonized aluminum chloride sludge and coke and aluminous ore; successively applying and carbonizing additional small percentages of aluminum chloride sludge with the said major portion of aluminous ore and said minor portion of coke during the longitudinal passage of the material-in-process through the said kiln until the total carbon in the aggregate constitutes at least 0.45 pound per pound of oxygen in the aluminous content thereof and until the carbonized aluminum chloride sludge at least equals in weight the said minor portion of coke initially charged to the kiln with the aluminous ore; discharging from the kiln an aggregate of fully carbonized aluminum chloride sludge and coke and aluminous ore; charging the said aggregate to a retort at a temperature between 1000° F. and 1500° F. and there reacting the hot aggregate with chlorine gas, thereby producing vapors of anhydrous aluminum chloride; cooling and condensing the vapors of anhydrous aluminum chloride and so separately obtaining the same.

10. The process of manufacturing anhydrous aluminum chloride which comprises: charging to a heated horizontal rotary kiln a major portion of aluminous ore and a minor portion of coke, said coke not exceeding in weight one sixth of the weight of the aluminous ore; rotating the kiln and thereby tumbling the aluminous ore and coke and so causing them to travel longitudinally through the said kiln; applying a small percentage of liquefied aluminum chloride sludge to the said major portion of aluminous ore and said minor portion of coke at a point near the charging end of said kiln; maintaining the temperature in the said kiln without a range that will carbonize the applied aluminum chloride sludge; carbonizing the applied small percentage of aluminum chloride sludge and thereby producing an aggregate of carbonized aluminum chloride sludge and aluminous material; successively applying and carbonizing additional small percentages of aluminum chloride sludge with the said major portion of aluminous ore and said minor portion of coke during the longitudinal passage of the material-in-process through the said kiln until the total carbon in the aggregate constitutes at least 0.45 pound per pound of oxygen in the aluminous content thereof; discharging from the kiln an aggregate of fully carbonized aluminum chloride sludge, coke, and aluminous ore; charging the said aggregate to a retort at a temperature between 1000° F. and 1500° F. and there reacting the hot aggregate with chlorine gas, thereby producing vapors of anyhdrous aluminum chloride; cooling and condensing the vapors of anyhydrous aluminum chloride and so separately obtaining the same.

References Cited in the file of this patent

UNITED STATES PATENTS

| | | |
|---|---|---|
| 1,099,096 | McAfee | June 2, 1914 |
| 1,147,832 | Kiegelgen et al. | July 27, 1915 |
| 2,084,290 | McAfee | June 15, 1937 |
| 2,357,621 | Tuttle | Sept. 5, 1944 |

UNITED STATES PATENT OFFICE

CERTIFICATE OF CORRECTION

Patent No. 2,835,554 May 20, 1958

William A. Pardee

It is hereby certified that error appears in the printed specification of the above numbered patent requiring correction and that the said Letters Patent should read as corrected below.

Column 2, line 35, after "just described" insert -- is discharged --.

Signed and sealed this 5th day of August 1958.

(SEAL)
Attest:

KARL H. AXLINE
Attesting Officer

ROBERT C. WATSON
Commissioner of Patents